United States Patent
Yamauchi

(10) Patent No.: US 6,176,128 B1
(45) Date of Patent: Jan. 23, 2001

(54) BOREHOLE TILT METER

(75) Inventor: Tsuneo Yamauchi, Nagoya (JP)

(73) Assignee: Techno Togo Limited Company, Mino (JP)

( * ) Notice: Under 35 U.S.C. 154(b), the term of this patent shall be extended for 0 days.

(21) Appl. No.: 09/405,906

(22) Filed: Sep. 24, 1999

Related U.S. Application Data

(62) Division of application No. 08/646,937, filed on May 8, 1996, now Pat. No. 6,021,676.

(51) Int. Cl.[7] .................................................... E21B 47/00

(52) U.S. Cl. ................................. 73/152.01; 33/310

(58) Field of Search ........................... 73/152.01; 33/304, 33/308, 310, 311, 313

(56) References Cited

U.S. PATENT DOCUMENTS

| | | | |
|---|---|---|---|
| 2,116,120 | * | 4/1938 | Malmgren ............................. 33/310 |
| 2,152,671 | * | 4/1939 | Smith ................................... 33/310 |
| 2,733,519 | * | 2/1956 | Murata .................................. 33/310 |
| 4,747,317 | * | 5/1988 | Lara .................................... 73/865.8 |
| 4,788,498 | * | 11/1988 | Uemura ........................... 324/207.16 |
| 5,201,128 | * | 4/1993 | Olivier et al. ..................... 33/355 R |

* cited by examiner

Primary Examiner—Max Noori

(57) ABSTRACT

A devised tilt meter detects tilt of the receptacle installed in the ground and/or in the solid construction, to detect the displacement of a pendulum suspended by thin metal springs. A cavity exists near the middle of the receptacle with a pendulum, the springs, a detector along the lateral side of the receptacle of the tilt meter. Wires for signal and power lines of other tilt meter are easily passed through this cavity. This mechanism with a cavity near the middle of the receptacle is very useful for an array observation of tilt in the ground and/or in a solid construction.

1 Claim, 8 Drawing Sheets

BOREHOLE TILT METER

This application is a division of 08/646,937 filing data May 8, 1996 U.S. Pat. No. 6,021,676.

BACKGROUND OF THE INVENTION

The present invention relates to a borehole tilt meter which is used in the ground and in a solid construction. Because the borehole tilt meter must come into closer contact using cement in the borehole, and a cylindrical closed receptacle has generally been used for the tilt meter, then it has been impossible to achieve a multiple instruction of tilt meters in the same borehole.

SUMMARY OF THE INVENTION

The present invention concerns a tilt meter for the borehole. The devised tilt meter utilizes a spring and a pendulum which are placed in a receptacle. The tilt meter is characterized by having a hollow part near the middle of the receptacle where wire lines for other tilt meter and/or other strain meter can be inserted.

BRIEF DESCRIPTION OF THE DRAWINGS

The invention disclosed herein will be better understood with reference to the following drawings. The devised tilt meters are characterized by an arrangement of springs, the pendulum and detector along the lateral wall of the receptacle.

DETAILED DESCRIPTION OF THE INVENTION

The invention concerns to a tilt meter to detect a tilt of the ground and/or the solid construction around the borehole.

Figure 1:
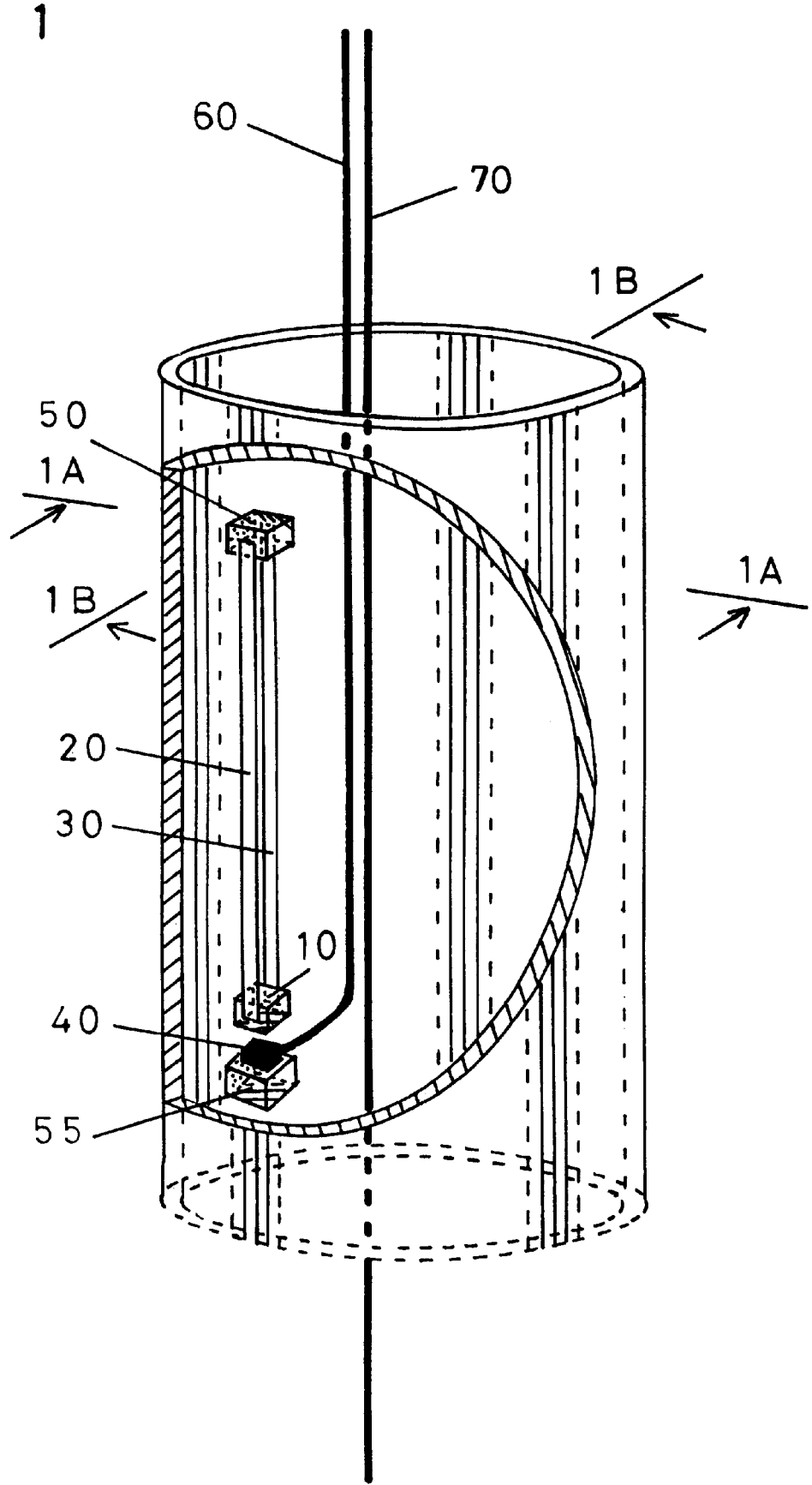
FIG. 1 is a view in perspective of a borehole tilt meter which detects a tilt of the ground and/or in a solid construction withdrawn in the present specification. A side wall of the cylindrical receptacle is placed in contact with the ground and/or the solid construction with cement. Numeral 10 is the pendulum, to detect the tilt of the ground and/or the solid construction around the borehole, and it is suspended by flat thin metal springs 20 and 30. Numeral 40 is a detector which is fixed on the metal fittings 50. A type of the detector is a magnetic displacement sensing transducer made by Makome Kenkyusho Co., Ltd. (Japan): U.S. Pat. No. 4,788,498. Numeral 60 is a wire for detector 40. Numeral 70 is a wire for another tilt meter of the same type which is set up in the lower part of the same borehole.
Figure 2:
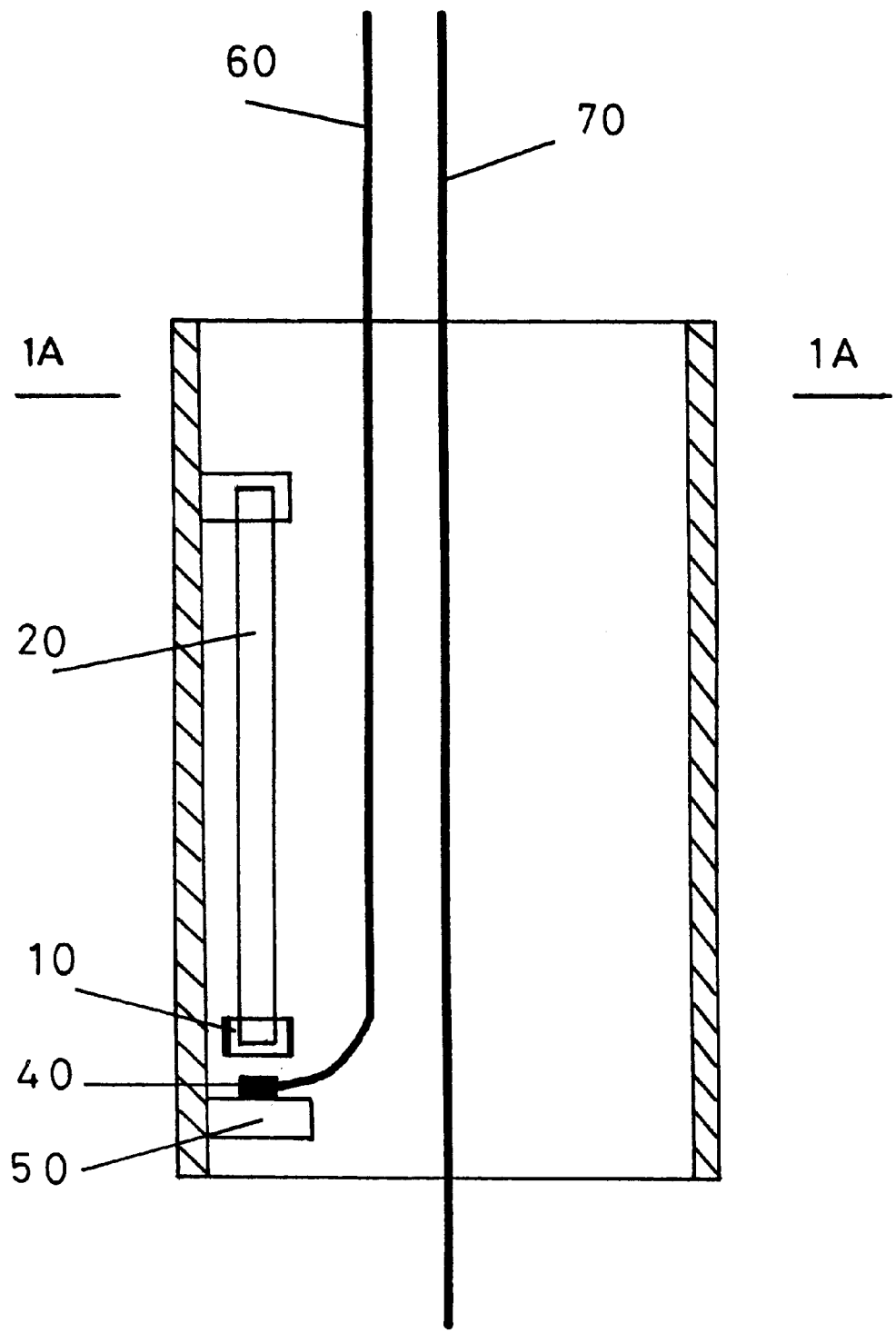
FIG. 2 is a cross-section view along line 1A—1A of FIG. 1. Numerals are the same as shown in FIG. 1.
Figure 3:
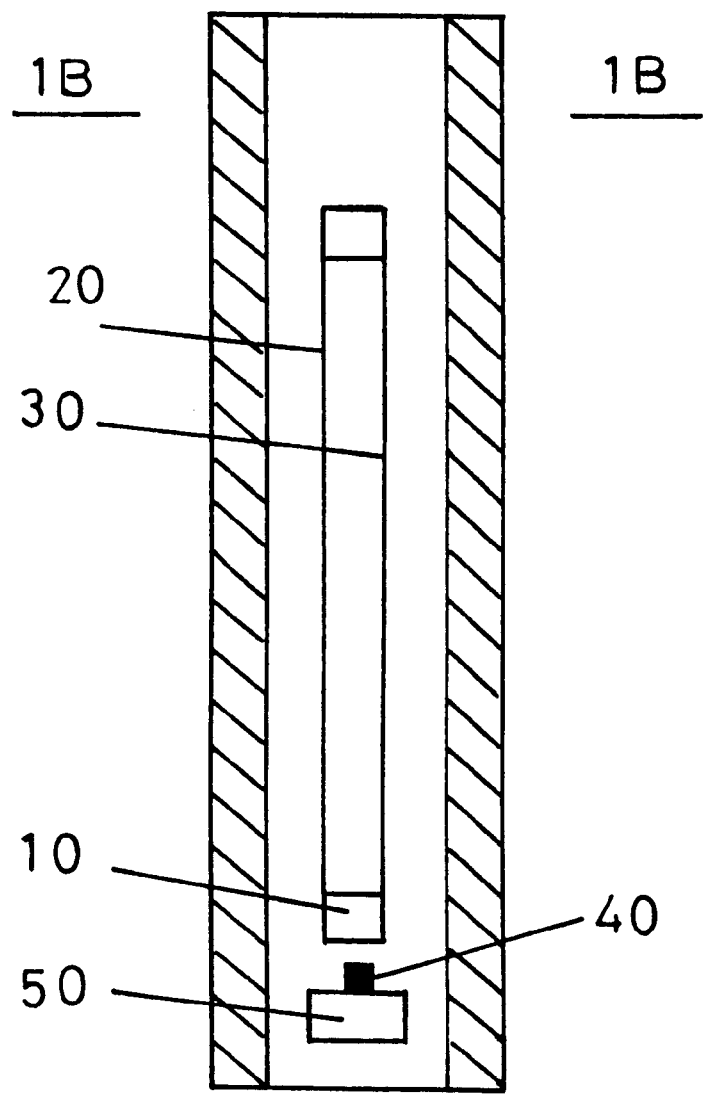
FIG. 3 is a cross-section view along line 1B—1B of FIG. 1. Numerals are the same as shown in FIG. 1, but wires are not shown in FIG. 3.

FIG. 1 is a view in perspective of the tilt meter. A side wall of the cylindrical receptacle is placed in contact with the ground and/or the solid construction with cement. FIG. 2 is a cross-sectional view of the tilt meter along a line 1A—1A of FIG. 1, which is perpendicular to an axis of the receptacle. FIG. 3 is a cross-sectional view of the tilt meter along another line 1B—1B which is perpendicular to the line 1A—1A of FIG. 1, and the line is also perpendicular to the axis of the receptacle. A pendulum 10 is suspended by flat springs 20 and 30 to detect the tilt in the direction of line 1B—1B of FIG. 1 around the borehole. Numeral 40 is the detector which is fixed on the metal fittings 50. The type of the detector is a magnetic displacement sensing transducer made by Makome Kenkyusho Co., Ltd. (Japan): U.S. Pat. No. 4,788,498. Numeral 60 is a wire for detector 40. Numeral 70 is a wire for another tilt meter of the same type which is set up in the lower part of the same borehole. These wires are connected with a recorder installed at the ground for recording the signals of detecting means.

Figure 4:
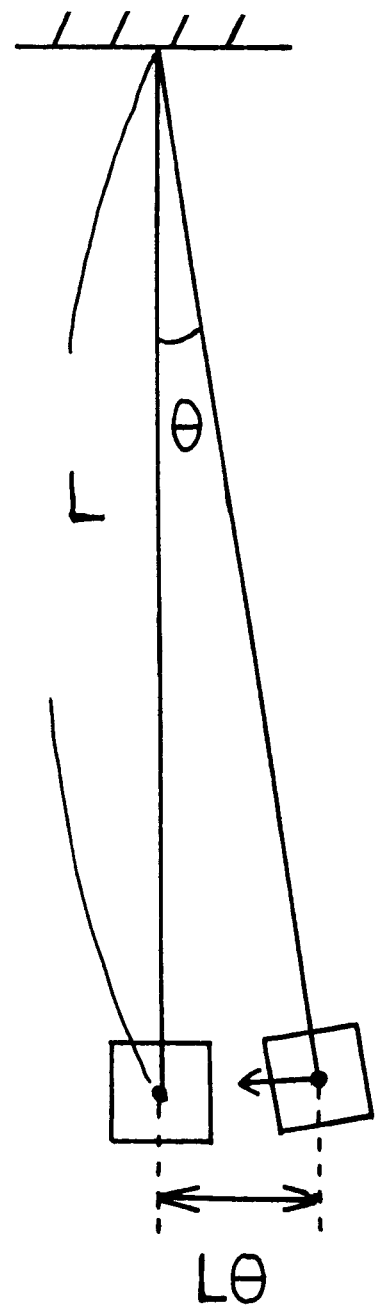
FIG. 4 is a cross-sectional view of the tilt meter for the explanation of the principle how to detect the ground tilt.

If we assumed that the pendulum is defined as a mass suspended from a fixed point by a weightless, inextensible string as shown in FIG. 4. When the ground inclined by an angle θ, the pendulum rotates to the new equilibrium position by the restoring force of the gravitational force. If the θ is small, we can approximate sin θ by θ, and we can detect the inclination of the ground as the displacement L θ of the pendulum, where L is the length of the string and θ is in radians. If we suspend the pendulum by flat thin springs as shown in FIG. 1, FIG. 2, and FIG. 3, we can detect the inclination of the ground and/or the solid construction. If we suspend the pendulum using single thin spring, we can also detect the inclination.

A tilt of the ground and/or the solid construction around the borehole in the direction of line 1B—1B in FIG. 1 is able to detect by the pendulum shown in FIG. 1, because the pendulum can only rotate in the direction of line 1B—1B, corresponding to the inclination of the ground and/or the solid construction. If another pendulum is set on another side wall perpendicular to the direction of line 1B—1B, a tilt of the ground and/or the solid construction around the borehole in the perpendicular direction of line 1B—1B (in the direction of line 1A—1A), is able to detect. If we suspend the pendulum with a thin metal wire, we can detect the tilt of the ground and/or the solid construction in any direction.

Figure 5:
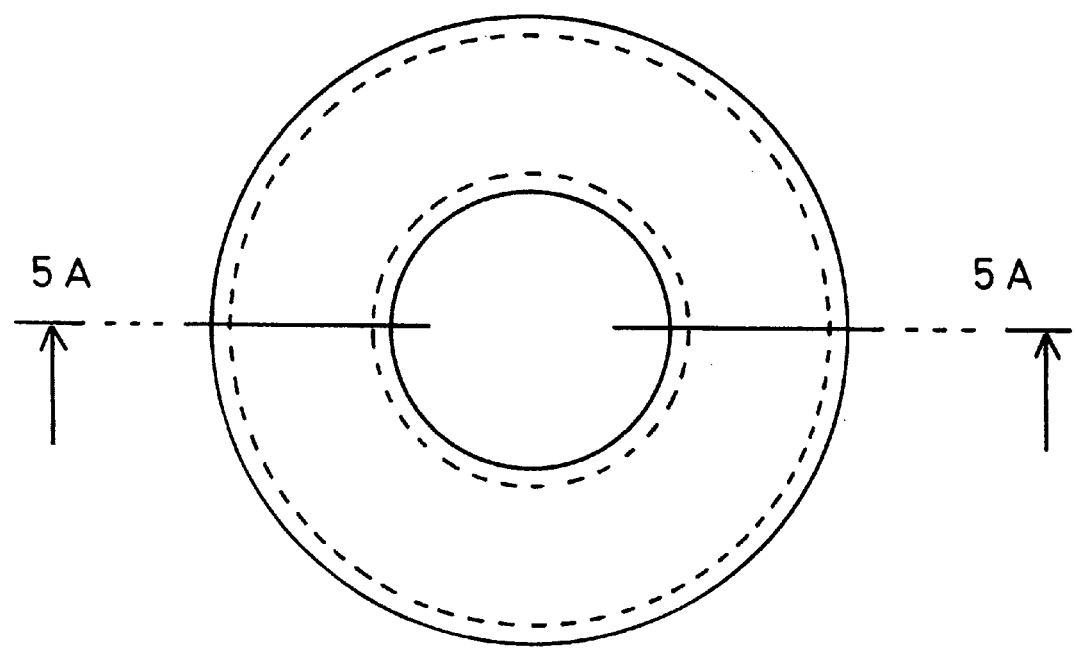
FIG. 5 is a view in perspective of a closed receptacle with a cylindrical cavity near the middle of the cylinder. Tilt meters are placed inside the receptacle so as to make a hollow space near the middle of the receptacle.
Figure 6:
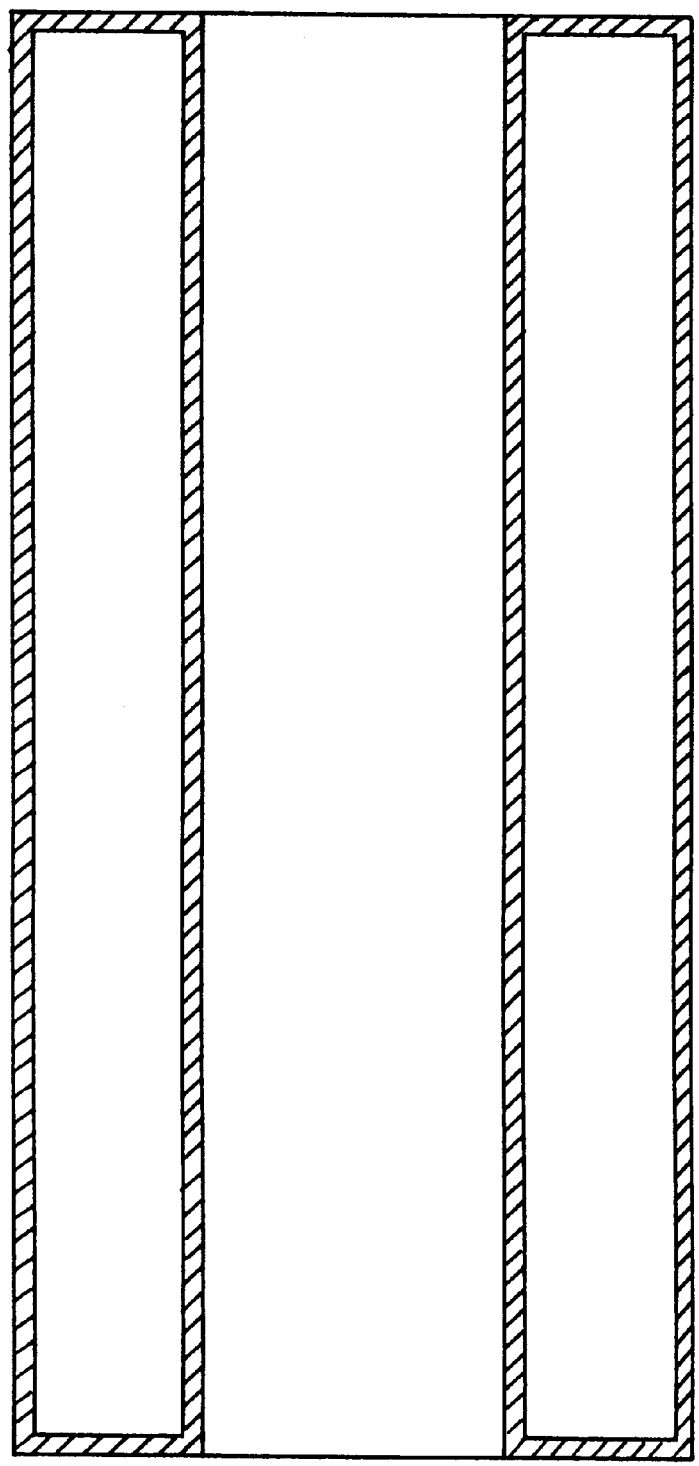
FIG. 6 is also a view in perspective of a closed receptacle having a semi cylindrical cavity near the middle of the cylinder. Tilt meters are placed inside the receptacle so as to make a hollow space near the middle of the receptacle.
Figure 7:
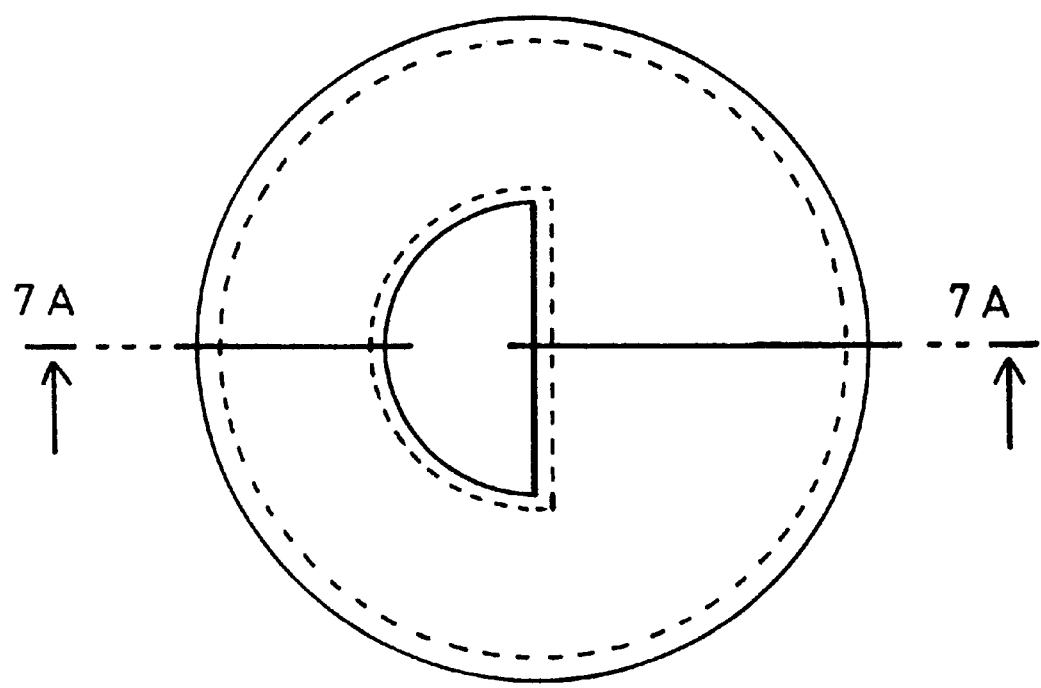
FIG. 7 is an end view of the closed receptacle with the receptacle's semi-cylindrical cavity near the middle of the cylinder.
Figure 8:
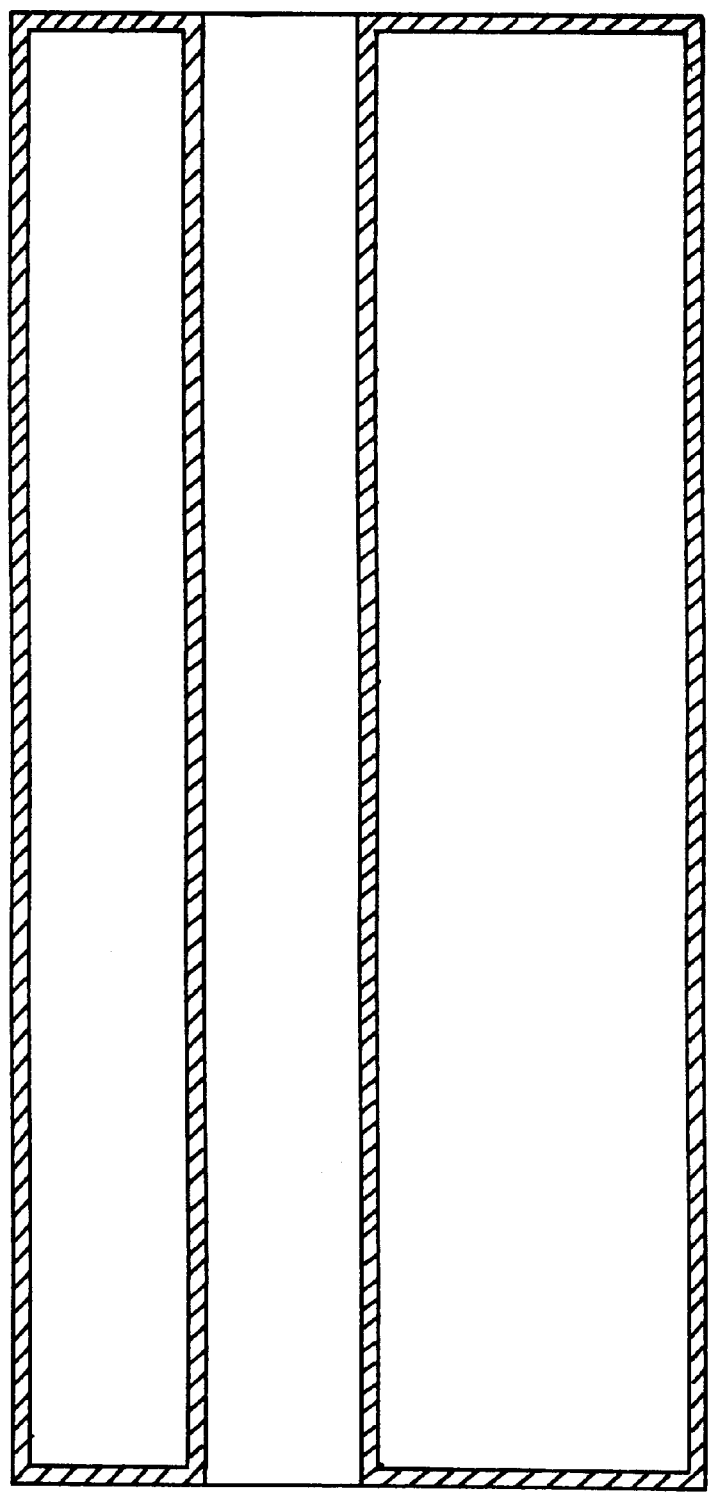
FIG. 8 is a cross-sectional view of the receptacle along line 7A—7A of FIG. 7, having a semi-cylindrical cavity near the middle of the cylinder.

Because of the arrangement of metal springs, the pendulum, detector and metal fittings, the tilt meter shown in FIG. 1 is characterized by having a cavity near the middle of the tilt meter. Wires for electric signal lines and/or power lines of other tilt meters and/or other strain meters can be passed through this cavity. Therefore, many tilt meter can be easily be installed in the same borehole. If moisture proofing is needed, the receptacle shown in FIG. 5 and/or FIG. 6 is suitable for the borehole tilt meter. These tilt meters are very useful for making an array observation of tilt in the ground and/or the solid construction.

It is to be understood that the invention is not limited to the precise embodiment described above and that minor modifications may be made within the scope of the invention.

What is claimed is:

1. A borehole tilt meter for measuring tilt of the ground or a solid construction comprising:

a hollow cylindrical receptacle having inner and outer walls;

a pendulum, as a mass to respond to the gravitational force, placed near a lateral side of said receptacle;

metal fittings attached on the inner side wall of said receptacle;

metal flat springs to suspend said pendulum and to restrict the rotation direction of said pendulum;

displacement detection means placed near the lateral side of the receptacle to measure the displacement of said pendulum;

power lines for powering said detection means to measure tilt direction of the ground or a solid construction;

recorder means installed on the ground to record the signals from said displacement detection means;

wires placed near the lateral side of said receptacle for transmitting electrical signals from said detection means to said recorder means and said power lines;

wherein the middle of said receptacle has sufficient cavity space to permit insertion of many wires relating to other tilt meters installed lower in a given borehole, thereby achieving a multiple instruction.

* * * * *